UNITED STATES PATENT OFFICE.

W. R. THOMAS AND M. EMANUEL, JR., OF CATASAUQUA, PENNSYLVANIA.

IMPROVED COMPOSITION FOR BLASTING-POWDER.

Specification forming part of Letters Patent No. 32,016 dated April 9, 1861; Reissue No. 1,435, dated March 17, 1863.

*To all whom it may concern:*

Be it known that we, W. R. THOMAS and MORGAN EMANUEL, JR., both of Catasauqua, in the county of Lehigh and State of Pennsylvania, have invented a new and Improved Composition for Blasting-Powder; and we do hereby declare that the following is a full, clear, and exact description of the same.

Our invention consists in the employment of a composition consisting of nitrate of soda or Chilian saltpeter mixed with sulphur, ground bark or its equivalent, and water. We prefer the following proportions, though these may be considerably varied without seriously affecting the value of the powder compounded therefrom: nitrate of soda, three and one-half pounds; flowers of sulphur, one and one-fourth pound; ground bark, four and one-half pounds; water, three quarts. The water should be first heated to the boiling-point, and the nitrate of soda then dissolved therein. Into this heated solution the bark should then be introduced and well stirred until it is perfectly saturated. The sulphur should then be added, and when the composition is afterward well dried it is ready for use.

We do not claim to have been the first to have conceived the idea of using the nitrate of soda instead of the nitrate of potash in the composition of powder. The two nitrates are so much alike that the use of one naturally suggests the use of the other. There is, however, one important difference between them. The nitrate of soda so readily and freely attracts moisture that powder formed by the mere substitution of this ingredient in the place of common saltpeter is found wholly unfit for use.

Our discovery consists in ascertaining that by the use of ground tan-bark or other equivalent unburnt carbonaceous substance instead of charcoal the compound does not attract moisture to such a degree as to render it unfit for blasting-powder, so that in this way a cheaper ingredient can be used in the composition of powder without essential detriment to the value of the compound when completed. We have also ascertained that by the use of nitrate of soda and ground bark or its equivalent a larger proportion of this carbonaceous matter (which is the cheapest ingredient used in the formation of powder) can be used than has before been found practicable, and thus the cost of the composition is further diminished.

Instead of ground bark, sawdust, rotten wood, and many other kinds of finely-divided vegetable substances may be used; but we prefer ground tan-bark, as it can generally be more readily obtained and seems to answer a better purpose than most other equivalent substances.

We are aware that a powder has been made by compounding saltpeter with sawdust and other ingredients; but the end now sought by us was not attained in that case, as there is no tendency to absorb moisture in a powder thus compounded, and therefore the difficulty which has been remedied by our invention was not then experienced.

We do not wish to limit our claim to the proportions of the ingredients above mentioned; but What we do claim as new, and desire to secure by Letters Patent, is—

1. A powder intended principally for blasting purposes, in which nitrate of soda is substituted for the nitrate of potash and the tendency of that salt to attract moisture is prevented by the use of ground bark or its equivalent instead of charcoal, substantially as above described.

2. A powder intended principally for blasting purposes, composed of sulphur, nitrate of soda, and ground bark or its equivalent, prepared substantially as above described.

WILLIAM R. THOMAS.
MORGAN EMANUEL, JR.

Witnesses:
CHAS. CORWIN,
DANIEL MILRAN.